US012382383B2

(12) United States Patent
Xu et al.

(10) Patent No.: US 12,382,383 B2
(45) Date of Patent: Aug. 5, 2025

(54) SYSTEMS AND METHODS FOR DYNAMIC EDGE COMPUTING DEVICE ASSIGNMENT AND REASSIGNMENT

(71) Applicant: Verizon Patent and Licensing Inc., Basking Ridge, NJ (US)

(72) Inventors: Kevin Xu, Warren, NJ (US); Charles P. Szrom, Bernardsville, NJ (US); Valerie Feldmann, Morristown, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 385 days.

(21) Appl. No.: 18/053,397

(22) Filed: Nov. 8, 2022

(65) Prior Publication Data

US 2024/0155475 A1 May 9, 2024

(51) Int. Cl.
*H04W 48/18* (2009.01)
*H04W 4/02* (2018.01)
*H04W 4/50* (2018.01)
*H04W 24/08* (2009.01)
*H04W 24/10* (2009.01)

(52) U.S. Cl.
CPC ............ *H04W 48/18* (2013.01); *H04W 4/02* (2013.01); *H04W 4/50* (2018.02); *H04W 24/08* (2013.01); *H04W 24/10* (2013.01)

(58) Field of Classification Search
CPC ......... H04W 36/0072; H04W 36/0033; H04W 36/185; H04W 36/0838; H04W 12/0433; H04W 12/04; H04W 76/27; H04W 24/02; H04W 76/16; H04W 12/043
See application file for complete search history.

(56) References Cited

U.S. PATENT DOCUMENTS

| | | | |
|---|---|---|---|
| 9,854,487 B2 * | 12/2017 | Kotecha | H04W 76/16 |
| 10,687,263 B2 * | 6/2020 | Paladugu | H04W 76/27 |
| 11,388,642 B2 * | 7/2022 | Paladugu | H04W 36/185 |
| 11,438,812 B2 * | 9/2022 | Kadiri | H04W 36/00838 |
| 11,490,274 B2 * | 11/2022 | Khanfouci | H04M 15/8038 |
| 12,149,964 B1 * | 11/2024 | Rajpal | H04L 43/08 |
| 2019/0036795 A1 * | 1/2019 | Ouyang | G06N 20/00 |

(Continued)

OTHER PUBLICATIONS

E. Pencheva, I. Atanasov, K. Kassev and V. Trifonov, "Location service in mobile edge computing," 2017 Ninth International Conference on Ubiquitous and Future Networks (ICUFN), Milan, Italy, 2017, pp. 617-622, doi: 10.1109/ICUFN.2017.7993865 (Year: 2017).*

*Primary Examiner* — William D Cumming

(57) ABSTRACT

A system described herein may identify a particular service provided by a first Edge Computing ("EC") device to a particular User Equipment ("UE"), and may monitor performance information associated with the first EC device and/or a second EC device. The system may determine, based on the monitoring, that the second EC device should provide the service to the particular UE in lieu of the first EC device; and may accordingly cause the service to be provided to the particular UE by the second EC device in lieu of the first EC device. The system may notify the first EC device that the second EC device has been selected to provide the service to the particular UE in lieu of the first EC device, and/or may notify the second EC device that the second EC device has been selected to provide the service to the particular UE.

20 Claims, 12 Drawing Sheets

(56) References Cited

U.S. PATENT DOCUMENTS

| | | | | |
|---|---|---|---|---|
| 2019/0253945 A1* | 8/2019 | Paladugu | .......... | H04W 12/0433 |
| 2020/0022035 A1* | 1/2020 | Kadiri | ............... | H04W 36/0072 |
| 2020/0169857 A1* | 5/2020 | Yang | .................. | H04L 43/0858 |
| 2020/0205040 A1* | 6/2020 | Jin | ..................... | H04W 36/0033 |
| 2020/0344657 A1* | 10/2020 | Paladugu | .......... | H04W 12/0433 |
| 2021/0266764 A1* | 8/2021 | Khanfouci | ............ | H04W 24/02 |
| 2022/0400422 A1* | 12/2022 | Paladugu | .............. | H04W 12/04 |
| 2024/0155475 A1* | 5/2024 | Xu | ........................ | H04W 24/10 |
| 2025/0097734 A1* | 3/2025 | Rajpal | ..................... | H04L 47/82 |

\* cited by examiner

SYSTEMS AND METHODS FOR DYNAMIC EDGE COMPUTING DEVICE ASSIGNMENT AND REASSIGNMENT

BACKGROUND

Wireless networks may utilize edge computing devices that are deployed in geographically diverse locations in order to provide services, such as low-latency services, to User Equipment ("UEs") such as mobile telephones, Internet of Things ("IoT") devices, tablets, etc. that are located in different regions. UEs may query one or more devices of the network, which may assign or select a particular edge computing device to provide services to respective UEs based on location or other factors.

DETAILED DESCRIPTION OF EXAMPLE EMBODIMENTS

The following detailed description refers to the accompanying drawings. The same reference numbers in different drawings may identify the same or similar elements.

Figure 1:
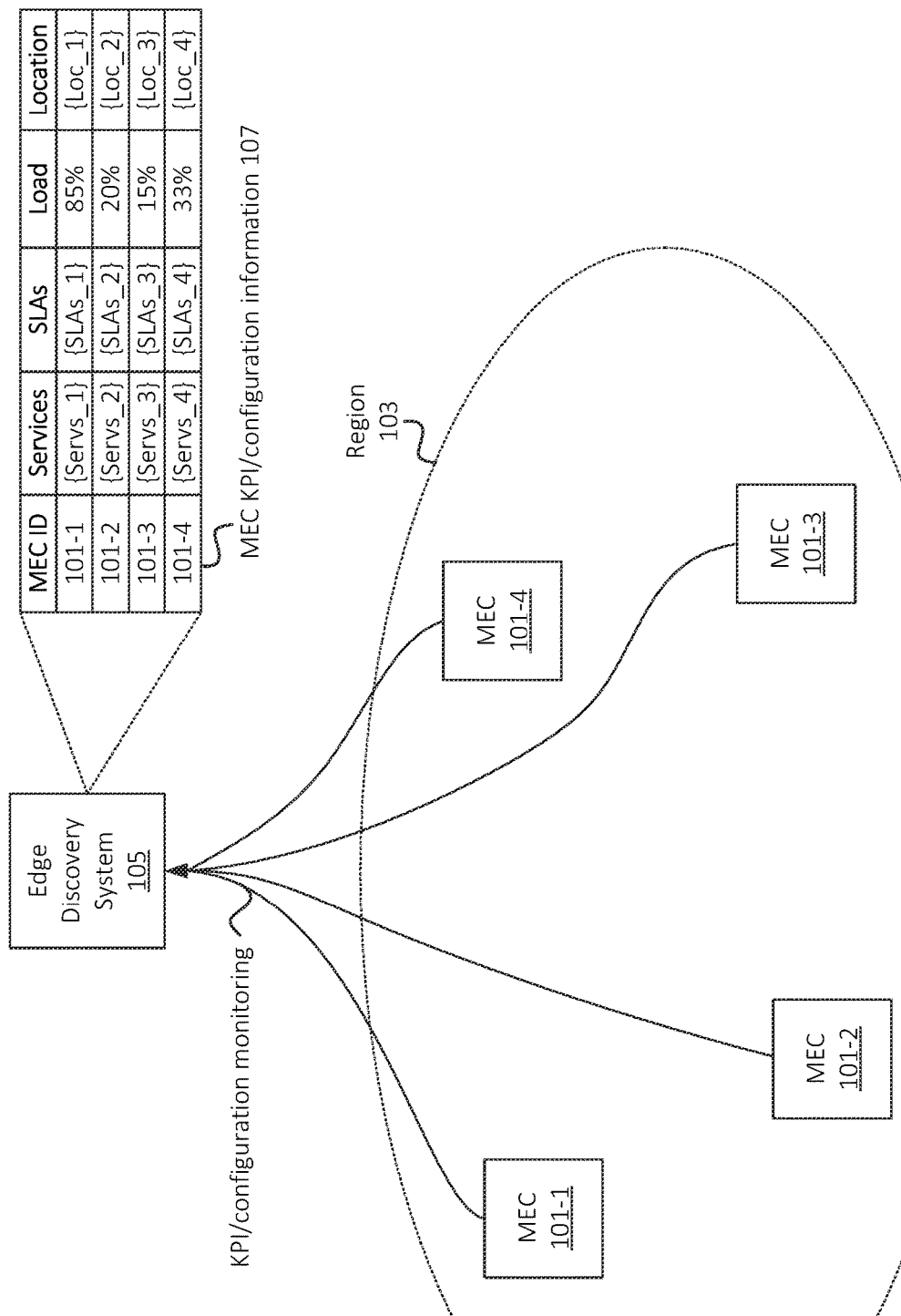
FIG. 1 illustrates an example of edge computing device monitoring, in accordance with some embodiments.

As shown in FIG. 1, a network may include and/or may be communicatively coupled to a set of edge computing devices, such as Multi-Access/Mobile Edge Computing ("MEC") devices 101, referred to sometimes herein simply as a "MECs 101." Edge computing devices, such as MECs 101, may be deployed at hardware resources that are located at geographically distinct locations, such as interspersed within a particular geographical region, such as region 103, which may represent a country, a state, a province, a city block, or some other suitable type of geographical region. The MECs may be co-located with (e.g., located at or geographically proximate to) base stations or other wireless network infrastructure via which UEs receive wireless network connectivity. Each MEC 101 may include or implement services, applications, or other containerized functions. Such services may, in some situations, include latency-sensitive services such as augmented reality ("AR") services, autonomous or semi-autonomous vehicle control services, automated factory robot control services, or other types of services. When a UE receives services from a given MEC 101, traffic associated with such services may not need to traverse, be routed through, etc. a core of the network, a "far cloud," or other resources that are geographically further from the UE than MEC 101.

The network may include Edge Discovery System ("EDS") 105, which may maintain configuration information (e.g., as shown in data structure 107) regarding MECs 101, such as locations of MECs 101, particular services installed or otherwise available at MECs 101, hardware capabilities or attributes (e.g., quantity or types of processors, amount of storage space, types of storage devices, etc.), and/or other types of configuration information. In accordance with some embodiments, EDS 105 may further maintain up-to-date monitoring information (e.g., Key Performance Indicators ("KPIs"), performance monitoring information, etc.) associated with MECs 101, such as load information (e.g., an amount of used and/or available processor resources, an amount of used and/or available memory resources, an amount of used and/or available network resources, etc.), Service Level Agreement ("SLA") information, and/or other suitable information.

In the example of FIG. 1, the load information is represented as a percentage for the sake of simplicity. For example, MEC 101-1 is indicated as "85% loaded," MEC 101-2 is indicated as "20% loaded," etc. In practice, the load for each MEC 101 may be represented differently and/or with additional levels of granularity. For example, an aggregate measure of load for each MEC 101 may be represented as one or more scores (e.g., on a normalized scale, such as 1-100), and/or may include one or more scores or other values reflecting particular load metrics (e.g., one score or value for processor load, one score or value for memory load, etc.). In some embodiments, the load information for a given MEC 101 may include one or more categories, labels, etc. (e.g., "underutilized," "overloaded," "congested," or the like).

The SLA information for a given MEC 101 may indicate SLAs or other Quality of Service ("QoS") parameters associated with the given MEC 101, such as a measure of latency or throughput that can be provided by MEC 101, identifiers of particular SLAs or other QoS parameters that are able to be satisfied or provided by MEC 101, and/or other suitable SLAs or QoS parameters. In other words, in some embodiments, data structure 107 may indicate particular SLAs or QoS parameters that a given MEC 101 is able to "guarantee" or otherwise satisfy.

In some embodiments, the SLAs or QoS parameters may be specific to particular locations within region 103. For example, the same MEC 101 (e.g., MEC 101-1) may be associated with a first set of SLAs (e.g., a first measure of latency) with respect to services provided within a first sub-region of region 103 (e.g., within 25 meters of a particular base station with which MEC 101-1 is associated), and may be associated with a second set of SLAs (e.g., a second, higher measure of latency) with respect to services provided within a second sub-region of region 103 (e.g., greater than 25 meters but less than 50 meters from the particular base station with which MEC 101-1 is associated).

In some embodiments, data structure 107 may include additional or different information than the examples provided above. For example, in addition to or in lieu of load information, data structure 107 may include performance information or other KPIs, which may indicate measured or predicted values associated with performance or other aspects of a given MEC 101. For example, data structure 101 may include, for one or more MECs 101, monitored throughput metrics, monitored latency metrics, predicted throughput metrics, predicted latency metrics, etc. In some embodiments the "predicted" performance information, KPIs, etc. mentioned above may be predicted via artificial intelligence/machine learning ("AI/ML") techniques or other suitable predictive modeling techniques. In some embodiments, EDS 105 may dynamically determine, on an ongoing basis, which SLAs or QoS parameters are able to be "guaranteed" by, or otherwise provided by, particular MECs 101 based on monitoring performance information associated with such MECs 101.

In some embodiments, EDS 105 may receive the monitoring information from each MEC 101 via an application programming interface ("API") or other suitable communication pathway between MECs 101 and EDS 105. In some embodiments, MECs 101 may "push" the monitoring information to EDS 105, for example, on a periodic basis, an intermittent basis, an event-driven basis (e.g., when a given MEC 101 is experiencing a relatively high measure of load, when a given MEC 101 has a relatively high amount of available resources, when a given MEC 101 experiences an error or exception, etc.), and/or on some other suitable basis. In some embodiments, EDS 105 may "pull" the monitoring information, such as by sending requests to MECs 101 for some or all types of monitoring information. In some embodiments, EDS 105 may receive the MEC monitoring information from some other suitable device that collects, maintains, provides, etc. such information.

Figure 2:
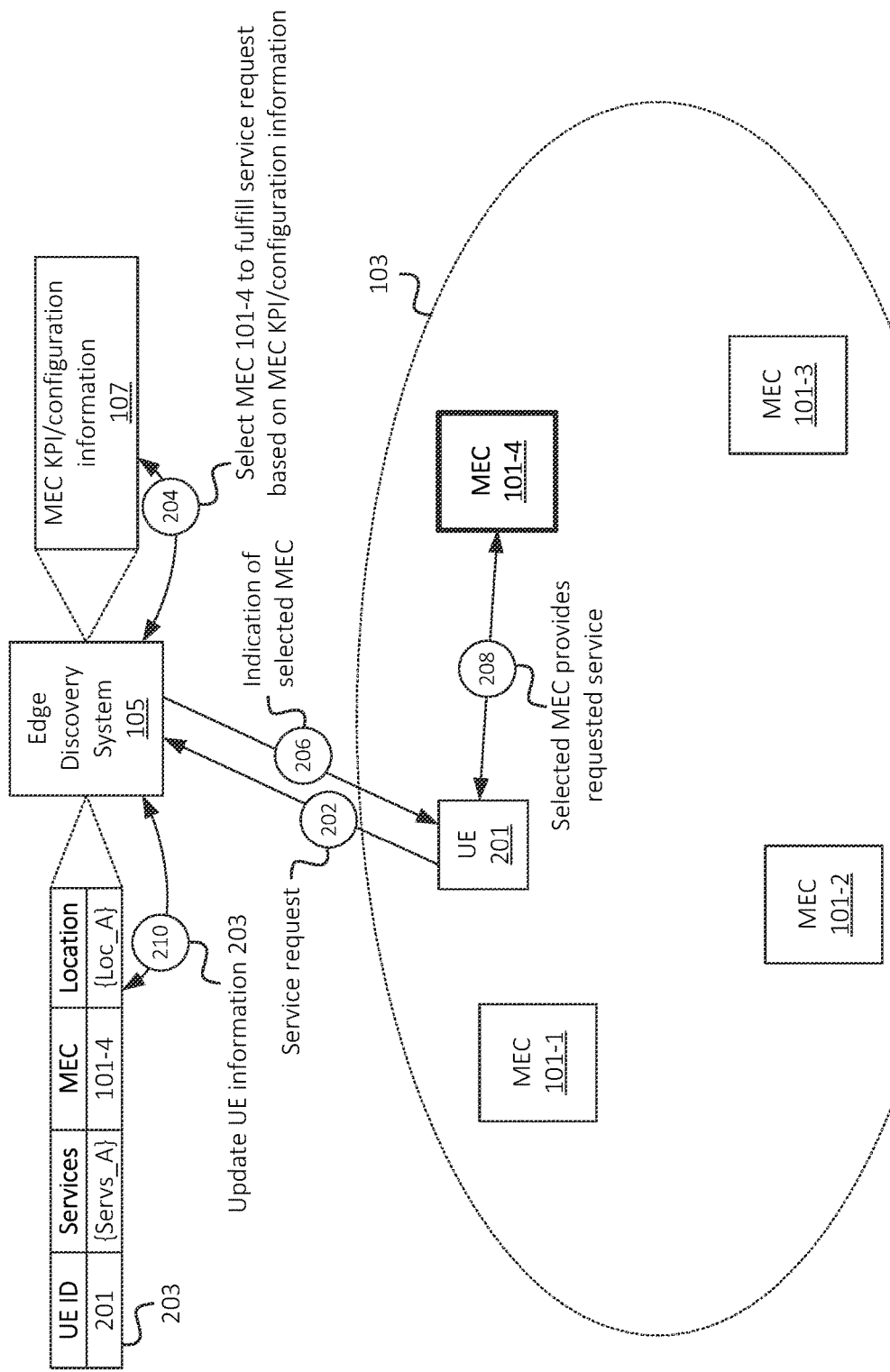
FIG. 2 illustrates an example selection of a particular edge computing device to provide a service to a UE, in accordance with some embodiments.

In some embodiments, EDS 105 may utilize the MEC monitoring information (e.g., MEC KPIs and/or configuration information stored in data structure 107) when selecting a particular MEC 101 to provide a service requested by a particular UE. For example, as shown in FIG. 2, EDS 105 may receive (at 202) a service request from UE 201. In some embodiments, the service request (sent at 202) may include information that may be used by EDS 105 to select a particular MEC 101 to fulfill the service request, such as an identifier or other indication of the requested service, one or more identifiers of UE 201 (e.g., a Subscription Permanent Identifier ("SUPI"), a Globally Unique Temporary Identifier ("GUTI"), an International Mobile Station Equipment Identity ("IVEI") value, a Mobile Directory Number ("MDN"), etc.), a geographical location of UE 201, requested QoS parameters and/or SLAs (e.g., a requested maximum latency, a requested minimum throughput, and/or other QoS parameters or SLAs), etc. In some embodiments, UE 201 may include or implement an API, a client, or other suitable communication pathway or mechanism by which UE 201 is able to communicate with EDS 105. For example, UE 201 may receive an Internet Protocol ("IP") address, Fully Qualified Domain Name ("FQDN"), a Uniform Resource Locator ("URL"), a Uniform Resource Identifier ("URI"), and/or other suitable locator information via which UE 201 is able to identify and communicate with EDS 105.

EDS 105 may select (at 204) a particular MEC 101 to fulfill the service request. In this example, EDS 105 may select MEC 101-4 to fulfill the service request, based on factors such as the requested service being installed at (or otherwise available at) MEC 101-4, MEC 101-4 being geographically proximate to UE 201 (although not necessarily the closest MEC to UE 201, as shown in this example), KPI and/or configuration information associated with MEC 101-4 and/or other MECs 101, and/or other factors. For example, EDS 105 may determine that, based on up-to-date monitoring information received from MECs 101-1 through 101-4, that MEC 101-4 is able to provide the requested service with a set of performance metric, KPIs, etc. that satisfy SLAs or other QoS parameter associated with the service. Such determination may be based on, for example, identifying information (e.g., as stored in data structure 107) indicating that MEC 101-4 is capable of providing the requested service (e.g., has one or more containers or applications installed or available to be installed via which the service may be provided), and/or that the service and/or MEC 101-4 are associated with one or more policies indicating that UE 201 is authorized to receive the service from MEC 101-4. As another example, the selection (at 204) of MEC 101-4 may be based on identifying that MEC 101-4 is able to deliver the service with the highest measure of performance or QoS parameters (e.g., based on the location of UE 201, based on network conditions between UE 201 and one or more base stations, etc.) to UE 201. As yet another example, the selection (at 204) of MEC 101-4 may be based on determining that one or more other MECs 101 are overloaded (e.g., are experiencing one or more measures of load that exceed one or more thresholds) and/or that MEC 101-4 is relatively underloaded (e.g., is experiencing a relatively low measure of resource utilization). In some embodiments, the selection (at 204) may be based on other factors pertaining to UE 201, MECs 101, load balancing considerations, or other factors.

EDS 105 may accordingly provide (at 206) an indication of the selected MEC 101-4, which may include providing an IP address or other suitable locator information associated with MEC 101-4 to UE 201. In some embodiments, EDS 105 may perform other operations based on the request, such as notifying MEC 101-4 that MEC 101-4 has been selected to provide services to UE 201, instructing MEC 101-4 to install or activate the requested service, etc. Based on receiving (at 206) the indication of the selected MEC 101-4, UE 201 may communicate (at 208) with MEC 101-4 to receive the service. For example, one or more applications associated with UE 201 may specify MEC 101-4 as a communication endpoint for communications, associated with the service, to and/or from UE 201. In this manner, UE 201 may receive the requested service in accordance with SLAs, QoS parameters, load balancing considerations, etc., as provided by EDS 105.

EDS 105 may also maintain or update (at 210) ULE information (e.g., data structure 203) to reflect that UE 201 is receiving the requested service from MEC 101-4. For example, data structure 203 may include information indicating one or more services received by UE 201, as well as which respective MEC(s) 101 is/are providing such services to UE 201. In this example, data structure 203 may indicate a set of services (represented in the figure as "{Servs_A}") that are provided to UE 201 by MEC 101-4 and/or other MECs 101. In some embodiments, data structure 203 may include SLAs, QoS parameters, etc. associated with such services. In some embodiments, data structure 203 may include one or more identifiers of UE 201, such as an IMEI value, an International Mobile Subscriber Identity ("IMSI") value, a SUPI value, a GUTI value, an IP address, an MDN, or other suitable identifier.

In some embodiments, EDS 105 may receive or maintain information (e.g., separately from data structure 203) indicating particular SLAs, QoS parameters, etc. associated with services provided by MECs 101, including the particular service provided (at 208) to UE 201 by MEC 101-4. In some embodiments, data structure 203 and/or some other data structure received or maintained by EDS 105 may include SLAs, QoS parameters, etc. UE 201. For example, UE 201 may be associated with a particular group or category of UEs that are associated with a particular priority level or category (e.g., first responders, semi-automated manufacturing robots, autonomous vehicles, etc.) that is associated with a particular set of SLAs or QoS parameters.

EDS 105 may also maintain (e.g., in data structure 203 or some other suitable data structure) monitoring information associated with UE 201, such as a current location of UE 201, which may include a geographical location, a set of latitude and longitude coordinates, an identifier of a particular base station or cell to which UE 201 is connected, a sector of a RAN in which UE 201 is located, etc. EDS 105 may receive such information from UE 201 directly (e.g., via an API, an application executing at UE 201, etc.) or from some other device or system that determines and/or maintains the location of UE 201 (e.g., an Access and Mobility Management Function ("AMF"), a Mobility Management Entity ("MME"), etc.). In some embodiments, EDS 105 may receive or maintain other monitoring information pertinent to UE 201, such as network conditions, which may include an actual or predicted cell load, actual or predicted RAN congestion metrics, actual or predicted aggregated performance metrics, etc. of a RAN to which UE 201 is connected (e.g., associated with a particular base station or cell to which UE 201 is connected) or other suitable information. In some embodiments the "predicted" network condition information mentioned above may be predicted via AI/ML techniques or other suitable predictive modeling techniques.

Figure 3:
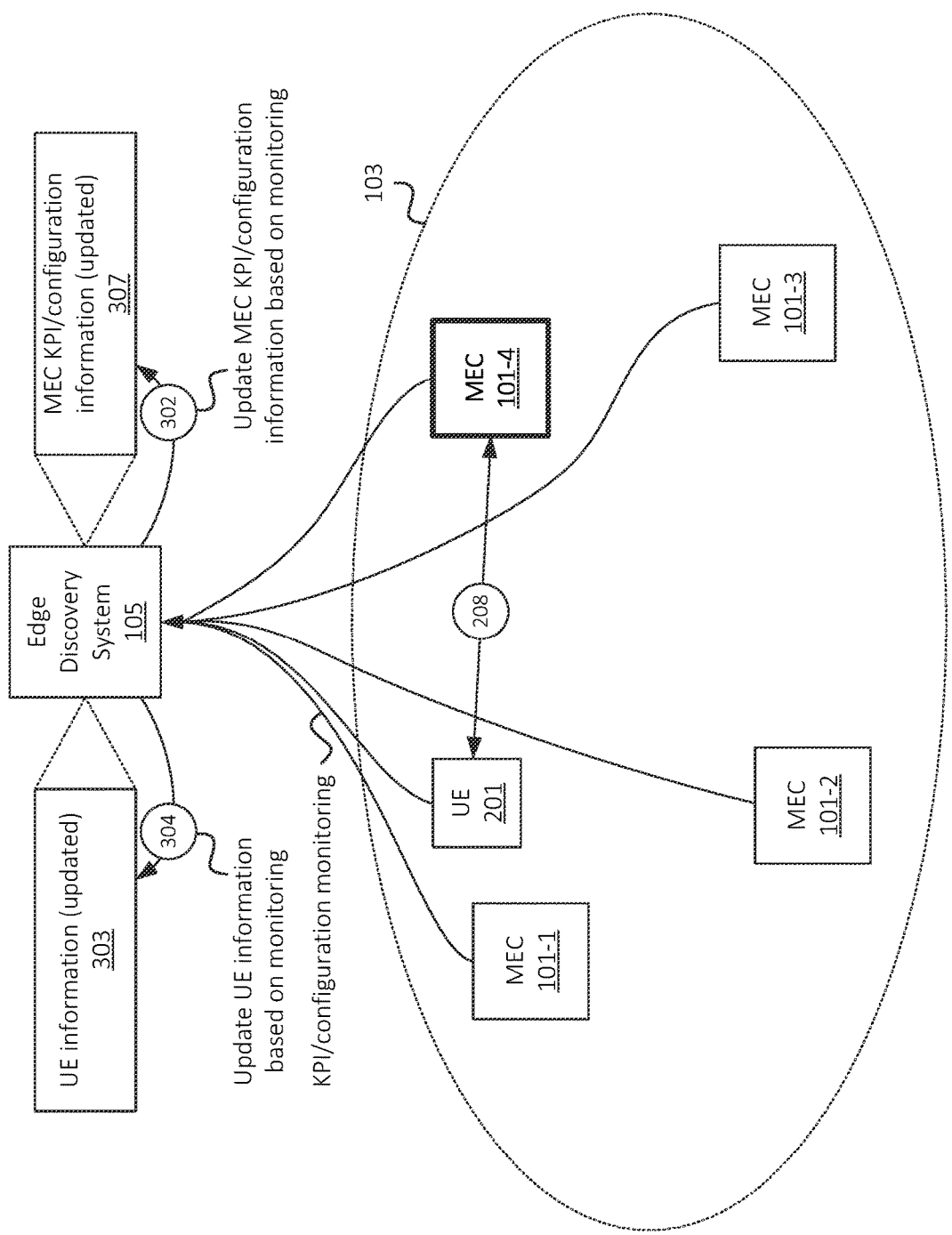
FIG. 3 illustrates an example of updating monitoring information for one or more edge computing devices after the particular edge computing device has been selected to provide the service to the UE, in accordance with some embodiments.

As shown in FIG. 3, after UE 201 has begun receiving (at 208) the requested service from MEC 101-4, EDS 105 may continue to monitor MECs 101, which may include receiving performance information, load information, and/or other suitable information associated with some or all of MECs 101 (i.e., MECs 101-1, 101-2, 101-3, and/or 101-4, in this example). EDS 105 may also receive monitoring information associated with UE 201, which may include receiving such information directly from UE 201, an AMF, an MME, and/or some other suitable device or system that collects, determines, and/or provides such information. EDS 105 may accordingly update (at 302) the stored information associated with MECs 101-1 through 101-4, which may include updating or modifying data structure 107, resulting in data structure 307 which reflects the updated MEC monitoring information. EDS 105 may also update (at 304) the information associated with UE 201, which may include updating or modifying data structure 203, resulting in data structure 303 which reflects the updated UE monitoring information.

Figure 4A:
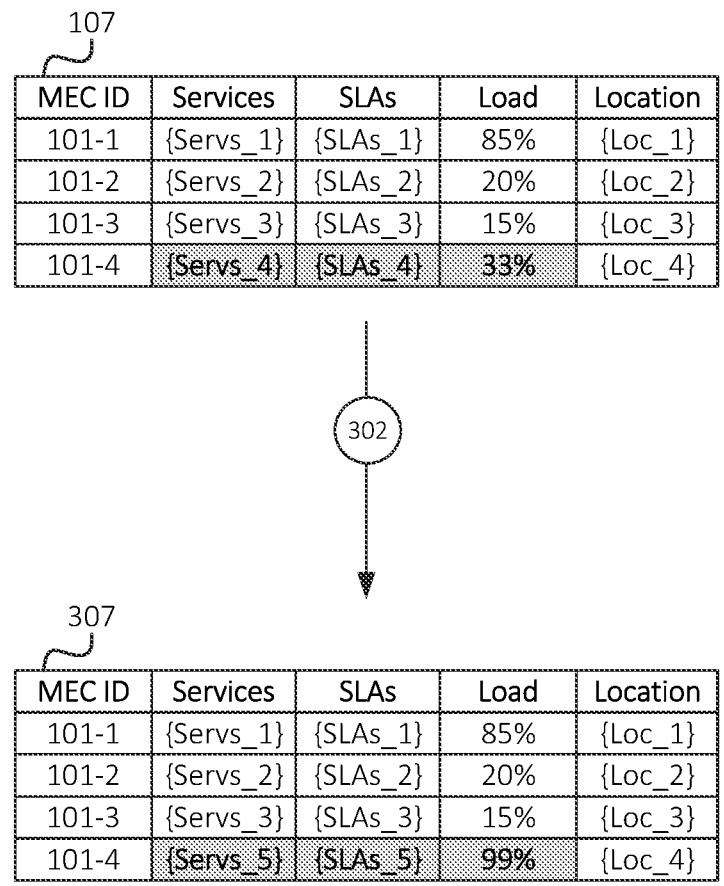
FIGS. 4A and 4B illustrate example data structures associated with updated edge computing device monitoring information, in accordance with some embodiments.

For instance, in the example of FIG. 4A, data structure 307 may reflect that load metrics associated with MEC 101-4 have increased, which may be determined by EDS 105 based on the monitoring of MEC 101-4 (and/or other MECs 101) as discussed above. For example, the example measure of load associated with MEC 101-4 may have increased from 33% to 99%. Further, in some embodiments, the set of SLAs associated with MEC 101-4 may have changed (e.g., due to the increase in load and/or other factors). For example, a first set of SLAs associated with MEC 101-4 (e.g., the performance of services delivered by MEC 101-4), shown as "{SLAs_4}" may be replaced with a different second set of SLAs, shown as "{SLAs_5}." In this example, the second set of SLAs may be associated with lower measures of performance (e.g., higher latency, lower throughput, etc.) than the first set of SLAs. That is, the SLAs that are able to be "guaranteed" by, or otherwise provided by, MEC 101-4 may have changed due to the increase in load, due to a reduction in performance metrics or KPIs associated with MEC 101-4, and/or other factors.

As further shown, in some embodiments, updated data structure 307 may reflect that the services offered by MEC 101-4 have changed from a first set of services (shown as "{Servs_4}") to a different second set of services, shown as "{Servs_5}." The change in supported services may be due to the increased load on MEC 101-4, a configuration change of MEC 101-4 (e.g., the removal or disabling of one or more containers, applications, etc. via which one or more services are provided), and/or other factors.

Figure 4B:
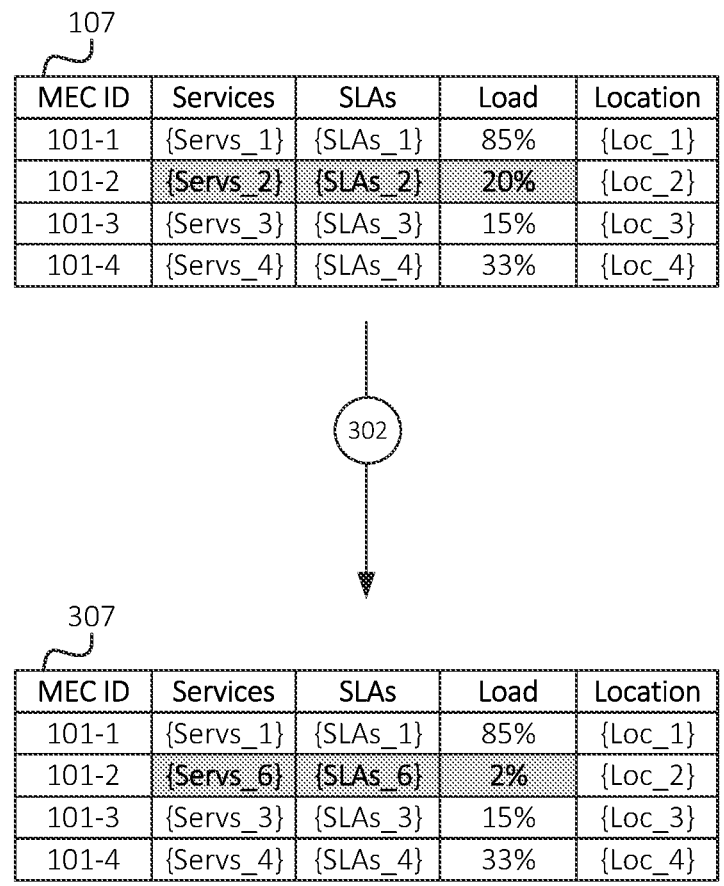

As another example, as shown in FIG. 4B, the updated MEC information (e.g., data structure 307) may reflect that load metrics associated with MEC 101-2 have decreased, such as a decrease in one or more measures of load associated with MEC 101-2 from 20% to 2%. As similarly noted above, data structure 307 may reflect a different set of SLAs offered by MEC 101-2 (e.g., "{SLAs_6}"), which may be due to the decrease in load and/or other factors. For example, {SLAs_6} may be associated with relatively higher performance than {SLAs_2}, such as lower latency, higher throughput, etc. As also similarly noted above, data structure 307 in the example of FIG. 4B may reflect a different set of services available at MEC 101-2 than data structure 107, which may be due to the lower measure of load, configuration changes, and/or other factors.

Figure 4C:
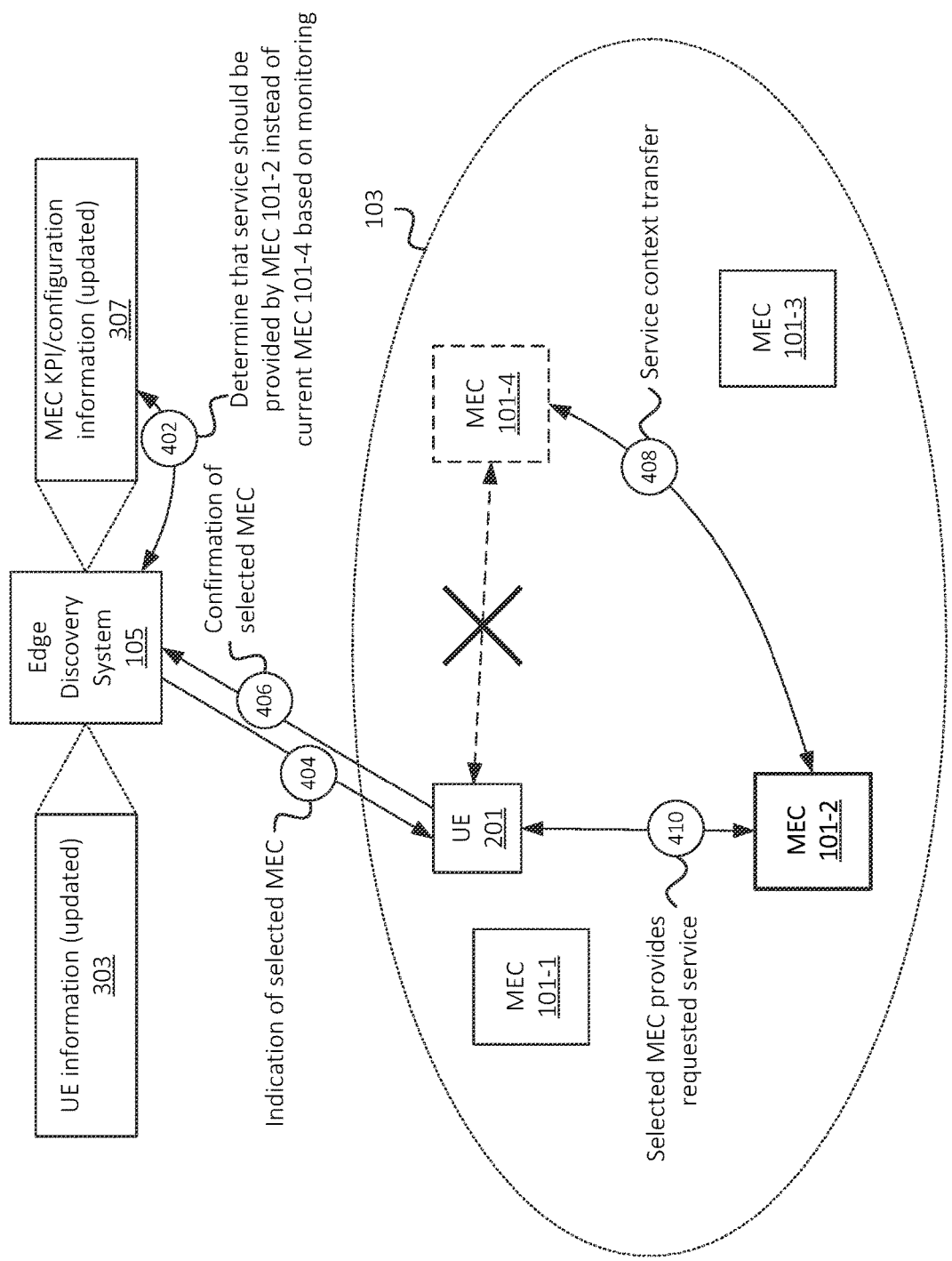
FIG. 4C illustrates the example selection of a particular edge computing device to provide the service, previously provided by another edge computing device, to the UE based on updated edge computing device monitoring information, in accordance with some embodiments.

As shown in FIG. 4C, EDS 105 may determine (at 402) that the service provided by MEC 101-4 to UE 201 should instead be provided by a different MEC 101 (i.e., MEC 101-2, in this example). For example, EDS 105 may determine, based on up-to-date monitoring of MECs 101, that MEC 101-2 providing the service to UE 201 instead of MEC 101-4 would result in a greater measure of performance or QoS than is currently provided by MEC 101-4, and/or may determine that MEC 101-2 providing the service would result in a greater measure of performance or QoS than is predicted to be provided by MEC 101-4 (e.g., based on AI/ML techniques or other suitable modeling techniques that generate predicted measures of performance or QoS associated with MECs 101-2 and/or 101-4). As another example, EDS 105 may determine that MEC 101-4 is overloaded, which may include determining (e.g., based on the monitoring of MEC 101-4) that an aggregate measure of load or score is above a threshold, and/or that one or more granular measures of load (e.g., processor load, memory load, central processing unit ("CPU") load, graphics processing unit ("GPU") load, etc.) are above one or more thresholds. As another example, EDS 105 may determine that MEC 101-2 is underutilized, which may include determining (e.g., based on the monitoring of MEC 101-2) that an aggregate measure of load or score is below a threshold, and/or that one or more granular measures of load associated with MEC 101-2 are below one or more thresholds.

In some embodiments, EDS 105 may determine that MEC 101-4 is not able to provide the service in accordance with SLAs, QoS parameters, etc. associated with the service (e.g., minimum throughput, maximum latency, etc.), and/or that MEC 101-2 is able to provide the service in accordance with such SLAs, QoS parameters, etc. (e.g., referring to the example shown in FIG. 4A). In some embodiments, EDS 105 may determine that MEC 101-4 is able to provide the service in accordance with the SLAs, QoS parameters, etc. associated with the service, but may determine that MEC 101-2 is able to provide the service in accordance with even higher measures of performance or QoS than was initially requested for the service (e.g., referring to the example shown in FIG. 4B). In some embodiments, EDS 105 may determine (at 402) that MEC 101-2 should provide the service to UE 201, instead of MEC 101-4, based on one or more other suitable factors or considerations in addition to or in lieu of the example factors described above.

EDS 105 may accordingly provide (at 404) an indication of the selected MEC 101-2, which may include providing an IP address or other suitable locator information associated with MEC 101-2 to UE 201. In some embodiments, the indication (at 404) may include a label, code, identifier, etc. indicating a reason or rationale for why MEC 101-2 has been selected. For example, EDS 105 may indicate (at 404) that MEC 101-4 is overloaded, is unable to provide the service in accordance with requested SLAs or QoS parameters associated with the service, etc. In some scenarios, EDS 105 may indicate (at 404) that MEC 101-2 is able to provide the service with different SLAs or QoS parameters than originally requested for the service (e.g., lower latency, higher throughput, etc.). In this sense, UE 201 may receive "upgraded" or "enhanced" SLAs or QoS for the requested service.

In some embodiments, UE 201 may present a prompt or other type of indication (e.g., a visual indication, an audible indication, etc.) via an output device, such as a display device, a microphone, a wearable communicatively coupled to UE 201, etc., indicating the selection of MEC 101-2. In some embodiments, the prompt or other indication presented by UE 201 may indicate the reason or rationale for the selection of MEC 101-2, which may include a determination that MEC 101-2 is able to provide upgraded or enhanced SLAs or QoS for the service. In some embodiments, UE 201 may receive a selection or confirmation (e.g., from a user of UE 201, from an application executing at UE 201 such as an application associated with the service) indicating that UE 201 and/or a user thereof accepts or approves the selection of MEC 101-2 in lieu of MEC 101-4 to provide the service. In some embodiments, EDS 105 may select MEC 101-2 to provide the service without awaiting or otherwise receiving (at 406) confirmation of the selection. In such embodiments, the selection of MEC 101-2 may be "seamless" or "invisible" to a user of UE 201.

In some embodiments, EDS 105 may perform other operations based on the selection of MEC 101-2 and/or the confirmation thereof from UE 201, such as notifying MEC 101-2 that MEC 101-2 has been selected to provide the service to UE 201, and/or instructing MEC 101-2 to install or activate the service. In some embodiments, EDS 105 may notify MEC 101-4 that MEC 101-2 has been selected to provide the service to UE 201. Based on receiving one or more such respective notifications, MECs 101-2 and/or 101-4 may perform (at 408) a service context transfer procedure. For example, MEC 101-4 may provide context information, state information, and/or other suitable information that may be used by MEC 101-2 to continue providing the service to UE 201 in a seamless manner. In some embodiments, UE 201 and/or one or more other devices or systems may participate in or otherwise facilitate the service context transfer (at 408).

Once UE 201 has received (at 404) the indication of the selected MEC 101-2 and/or has confirmed (at 406) the selection, and/or based on receiving an indication (e.g., from MEC 101-2, MEC 101-4, and/or other suitable device or system) that the service context transfer (at 408) has been completed, UE 201 may communicate (at 410) with MEC 101-2 to receive the service (e.g., to continuing receiving the service). For example, one or more applications associated with UE 201 may specify MEC 101-2 as a communication endpoint for communications, associated with the service, to and/or from UE 201. In this manner, UE 201 may continue receiving the service in accordance with SLAs, QoS parameters, load balancing considerations, etc., as provided by EDS 105.

Figure 5A:
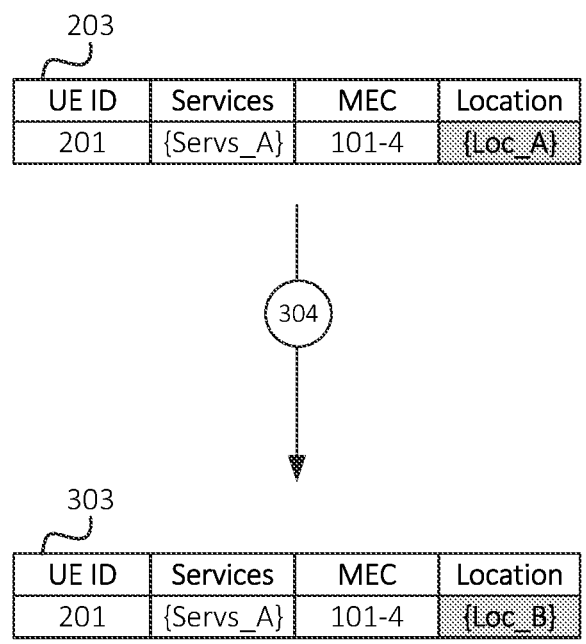
FIG. 5A illustrates an example data structure associated with updated UE monitoring information, in accordance with some embodiments.

As noted above, EDS 105 may update (at 304) information associated with UE 201 based on monitoring UE 201, such as a location of UE 201, a set of services requested by, provided to, and/or otherwise associated with UE 201, and/or other suitable information. For example, as shown in FIG. 5A, data structure 303 may reflect that, based on monitoring UE 201, EDS 105 has determined or otherwise received information indicating that UE 201 has moved from a first location within region 103 (i.e., "{Loc_A}," in this example) to a second location within region 103 (e.g., "{Loc_B}").

Figure 5B:
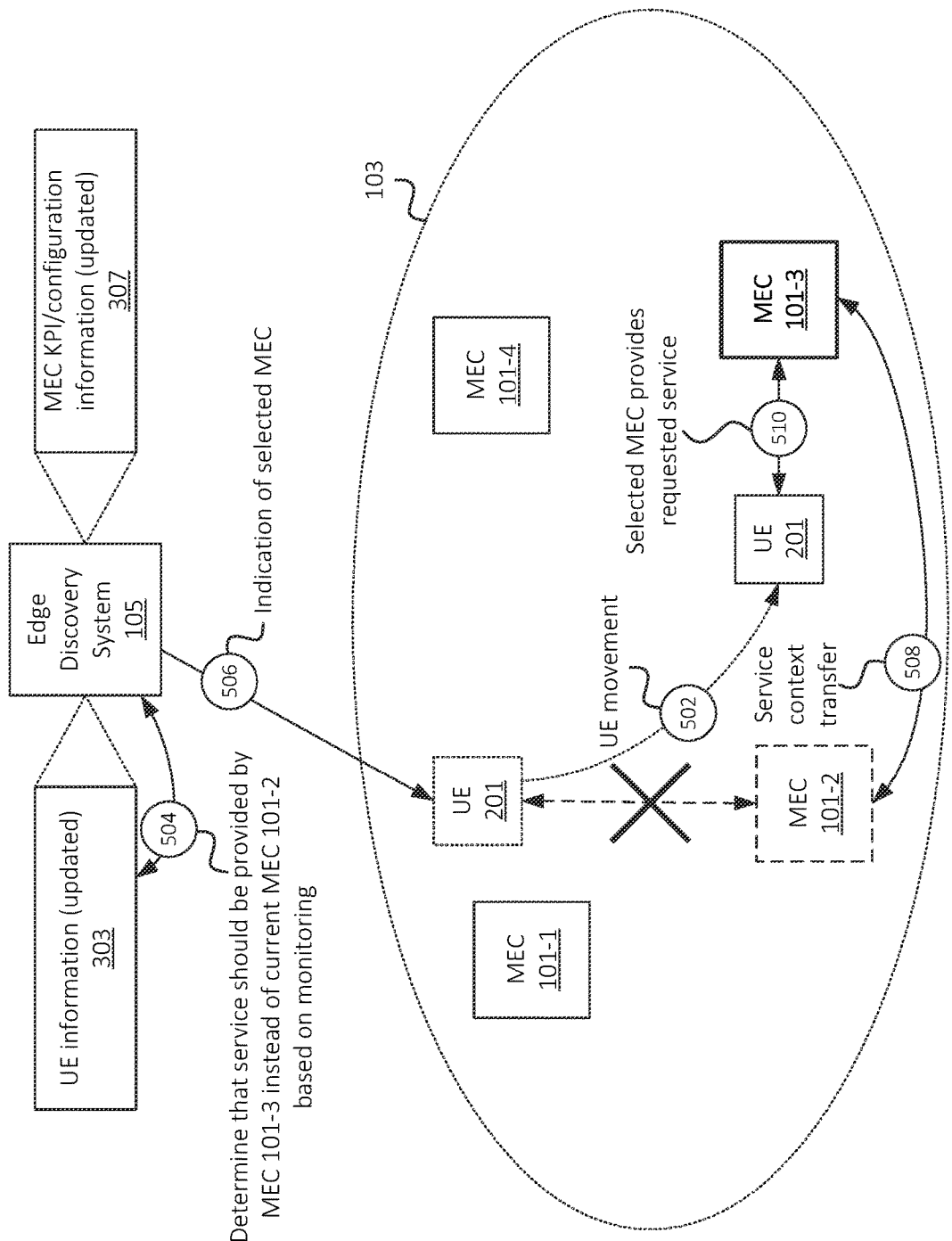
FIG. 5B illustrates the example selection of a particular edge computing device to provide the service, previously provided by another edge computing device, to the UE based on updated UE monitoring information, in accordance with some embodiments.

FIG. 5B shows an example of the movement (at 502) of UE 201 from the first location to the second location, while receiving the service from MEC 101-2. In some embodiments, the movement (at 502) may be determined based on an actual movement of UE 201 from the first location to the second location. Additionally, or alternatively, the movement (at 502) may be a predicted movement determined via AI/ML techniques or other suitable predictive modeling techniques.

Based on the actual or predicted movement of UE 201 (e.g., based on monitoring (at 304) the location and/or other information associated with UE 201 and/or based on AI/ML techniques or other suitable modeling techniques), EDS 105 may determine (at 504) that the service should be provided to UE 201 by MEC 101-3 in lieu of MEC 101-2. For example, EDS 105 may determine that MEC 101-3 is geographically closer to the new location of UE 201 than MEC 101-2. As another example, EDS 105 may determine that MEC 101-3 is able to provide higher measures of performance or QoS to UE 201 at the new location of UE 201 than MEC 101-3 was able to provide to UE 201 when UE 201 was located at the previous location. As another example, EDS 105 may determine that MEC 101-3 is able to provide higher measures of performance or QoS to UE 201 at the new location of UE 201 than MEC 101-2 is able to provide at the new location of UE 201. In some embodiments, EDS 105 may determine that the service should be provided to UE 201 by MEC 101-3 based on one or more other factors, such as KPI and/or configuration information associated with MECs 101-2 and/or 101-3 (e.g., as reflected in data structure 307 based).

As similarly discussed above, EDS 105 may indicate (at 506) the selected MEC 101-3 to UE 201. Although not shown again in FIG. 5B for the sake of brevity, UE 201 may confirm or receive a selection of the indicated MEC 101-3, and may indicate to EDS 105 that MEC 101-3 has been selected, confirmed, etc. EDS 105 may also indicate the selection MECs 101-2 and/or 101-3, and/or to one or more other suitable devices or systems. Accordingly, MECs 101-2 and 101-3 may perform (at 508) a context transfer associated with the service provided to UE 201, and UE 201 may communicate (at 510) with MEC 101-3 to receive the service.

Figure 6:
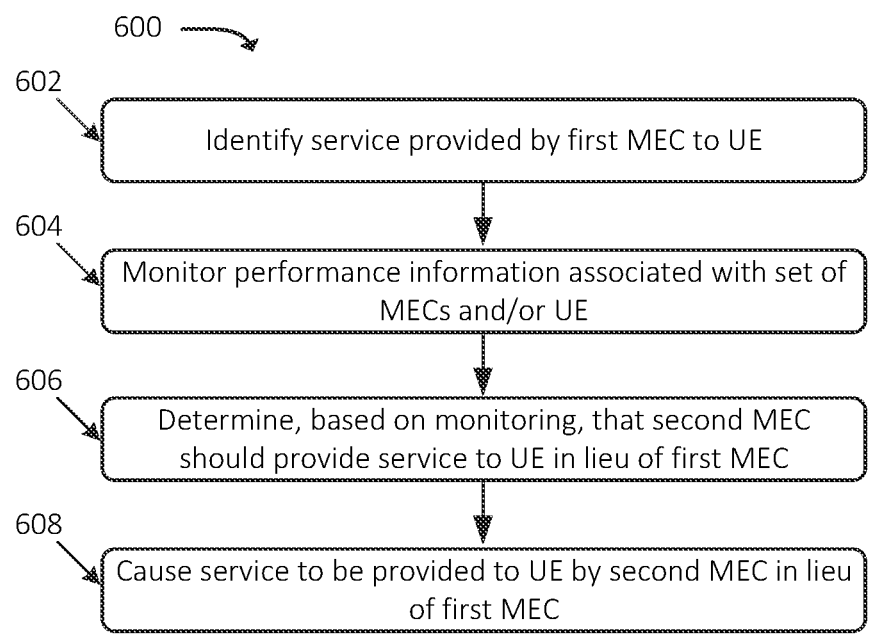
FIG. 6 illustrates an example process for dynamically reassigning edge computing devices to provide one or more services to a UE, in accordance with some embodiments.

FIG. 6 illustrates an example process 600 for dynamically reassigning edge computing devices (e.g., MECs 101) to provide one or more services to one or more UEs 201. In some embodiments, some or all of process 600 may be performed by EDS 105. In some embodiments, one or more other devices may perform some or all of process 600 in concert with, and/or in lieu of, EDS 105.

As shown, process 600 may include identifying (at 602) a service provided by a first MEC 101 to a particular UE 201. For example, as discussed above with respect to FIG. 2, EDS 105 may receive a service request from UE 201 and may select the first MEC 101 to provide the service to UE 201. Such selection may be based on SLAs or QoS parameters associated with the service, a location of UE 201, a location of the first MEC 101, load and/or performance information associated with MEC 101, and/or other suitable factors. In some embodiments, EDS 105 may otherwise identify that the first MEC 101 is providing the service to UE 201.

Process 600 may further include monitoring (at 604) performance information associated with a set of MECs 101 and/or UE 201. For example, EDS 105 may monitor performance information, load information, and/or other suitable metrics, KPIs, or monitoring information (referred to in the figure simply as "performance information" for the sake of brevity) associated with the first MEC 101 and/or one or more other MECs 101. As discussed above, EDS 105 may monitor such MECs 101 via "push" or "pull" techniques, and may receive the monitoring information directly from MECs 101 and/or from one or more other suitable information sources. In some embodiments, EDS 105 may monitor UE information, such as a set of services received by UE 201, a location of UE 201, requested SLAs and/or QoS parameters associated with services received by UE 201, and/or other suitable UE information.

Process 600 may additionally include determining (at 606), based on the monitoring, that the second MEC 101 should provide the service to UE 201, in lieu of the first MEC 101. For example, as discussed above, EDS 105 may determine that the first MEC 101 is unable to provide at least a threshold measure of performance associated with the service, may determine that UE 201 has moved (e.g., away from the first MEC 101 and/or towards the second MEC 101), that the first MEC 101 has become overloaded, that the second MEC 101 is underutilized, and/or may identify other factors that indicate that the second MEC 101 should provide the service to UE 201 in lieu of the first MEC 101.

Process 600 may also include causing (at 608) the service to be provided to UE 201 by the second MEC 101 in lieu of the first MEC 101. For example, as discussed above, EDS 105 may notify the first MEC 101, the second MEC 101, UE 201, and/or some other device or system that the second MEC 101 has been selected to provide the service to UE 101. As discussed above, the first MEC 101, the second MEC 101, UE 201, and/or some other suitable device or system may perform or may otherwise facilitate a context or state transfer associated with the service, such that UE 201 may continue to receive the service in a seamless manner.

While process 600 as well as the preceding examples have been described in the context of EDS 105 performing operations related to monitoring (e.g., at 604) one or more MECs 101 and/or UE 201, determining (e.g., at 606) that a different MEC 101 should provide a service to UE 201, and causing (at 608) the selected MEC 101 to provide the service to UE 201, in some embodiments one or more other devices or systems may perform some or all of these operations. For example, in some embodiments, the first MEC 101 (e.g., which originally provides the service to UE 201) may determine (e.g., at 606) that the first MEC 101 is overloaded and/or may otherwise determine that the service should be provided by a different MEC 101 (e.g., by the second MEC 101, and/or that the service should otherwise no longer be provided by the first MEC 101). As another example, the first MEC 101 may initiate, request, etc. a context transfer of the service (e.g., to the second MEC 101) based on such determination. In other words, some or all of the functionality described above with respect to EDS 105 may be performed by one or more MECs 101. In some embodiments, the determination that the second MEC 101 should provide the service (e.g., as performed at 606 by EDS 105 and/or by the first MEC 101) may eliminate the need for UE 201 to output requests (e.g., to EDS 105) for a different MEC 101 when performance of the service provided by the first MEC 101 falls below threshold SLAs or QoS parameters associated with the service, thus reducing the burden on UE 201 to make such requests.

Further, in some embodiments, the first MEC 101 and the second MEC 101 may be associated with different providers, operators, owners, carriers, or other entities. For example, the first MEC 101 may be provided by a first provider, and the second MEC 101 may be provided by a second provider. In some embodiments, such MECs 101 may be associated with one or more mechanisms, protocols, etc. whereby context information associated with services provided by such MECs 101 may be transferred, thus facilitating interoperability between MECs 101 associated with different providers as well as the providing of services from such MECs 101 in accordance with SLAs, QoS parameters, etc. associated with the services.

Figure 7:
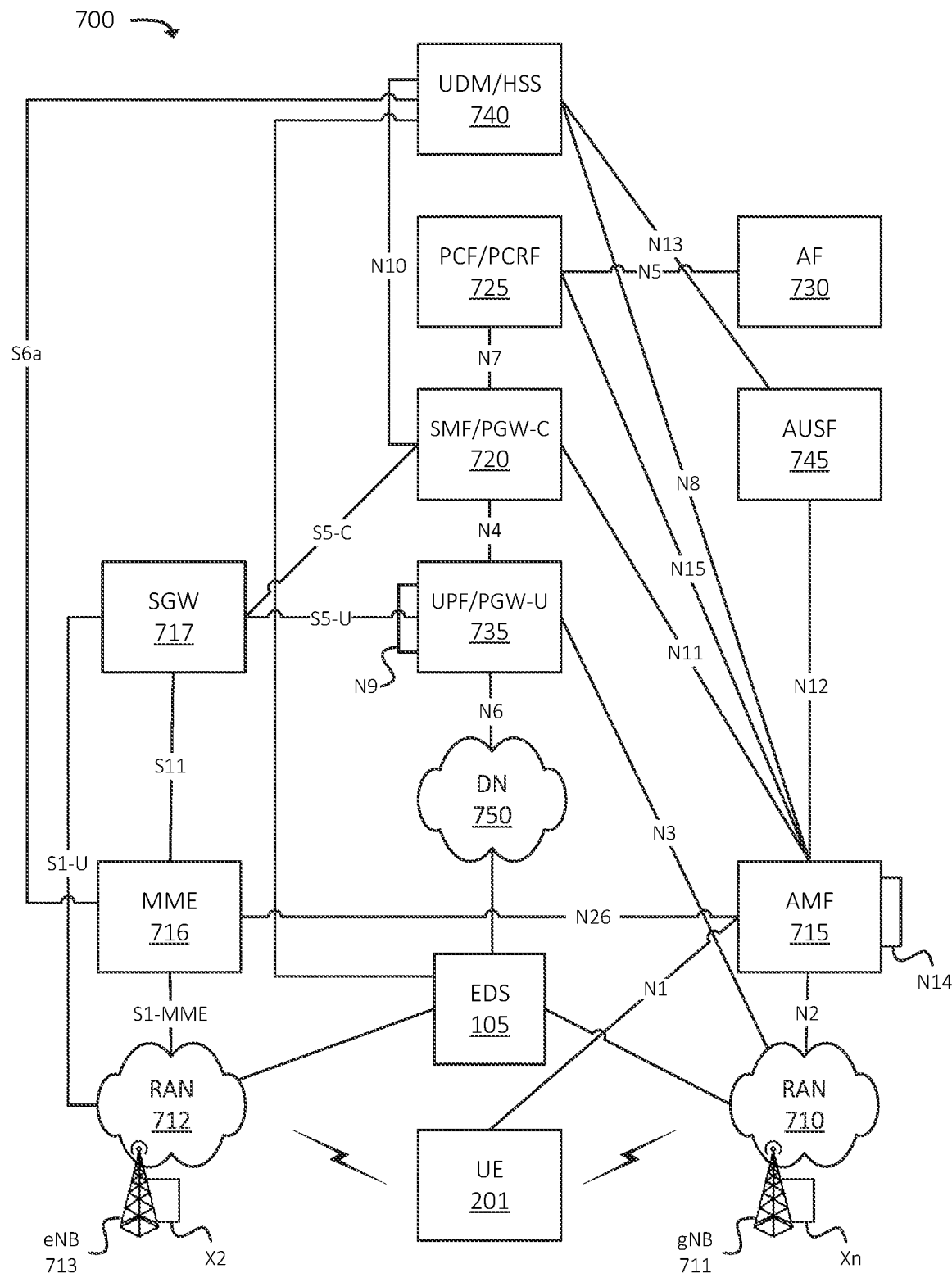
FIG. 7 illustrates an example environment in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 700 may represent or may include a 5G core ("5 GC"). As shown, environment 700 may include UE 701, RAN 710 (which may include one or more Next Generation Node Bs ("gNBs") 711), RAN 712 (which may include one or more evolved Node Bs ("eNBs") 713), and various network functions such as AMF 715, MME 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Unified Data Management ("UDM")/Home Subscriber Server ("HSS") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750), such as EDS 105.

The example shown in FIG. 7 illustrates one instance of each network component or function (e.g., one instance of SMF/PGW-C 720, PCF/PCRF 725, UPF/PGW-U 735, UDM/HSS 740, and/or AUSF 745). In practice, environment 700 may include multiple instances of such components or functions. For example, in some embodiments, environment 700 may include multiple "slices" of a core network, where each slice includes a discrete and/or logical set of network functions (e.g., one slice may include a first instance of SMF/PGW-C 720, PCF/PCRF 725, UPF/PGW-U 735, UDM/HSS 740, and/or AUSF 745, while another slice may include a second instance of SMF/PGW-C 720, PCF/PCRF 725, UPF/PGW-U 735, UDM/HSS 740, and/or AUSF 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 701 may include a computation and communication device, such as a wireless mobile communication device that is capable of communicating with RAN 710, RAN 712, and/or DN 750. UE 701 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 701 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 701 may communicate with one or more other elements of environment 700. UE 701 may communicate with RAN 710 via an air interface (e.g., as provided by gNB 711). For instance, RAN 710 may receive traffic (e.g., user plane traffic such as voice call traffic, data traffic, messaging traffic, etc.) from UE 701 via the air interface, and may communicate the traffic to UPF/PGW-U 735 and/or one or more other devices or networks. Further, RAN 710 may receive signaling traffic, control plane traffic, etc. from UE 701 via the air interface, and may communicate such signaling traffic, control plane traffic, etc. to AMF 715 and/or one or more other devices or networks. Additionally, RAN 710 may receive traffic intended for UE 701 (e.g., from UPF/PGW-U 735, AMF 715, and/or one or more other devices or networks) and may communicate the traffic to UE 701 via the air interface.

RAN 712 may be, or may include, a LTE RAN that includes one or more base stations (e.g., one or more eNBs 713), via which UE 701 may communicate with one or more other elements of environment 700. UE 701 may communicate with RAN 712 via an air interface (e.g., as provided by eNB 713). For instance, RAN 712 may receive traffic (e.g., user plane traffic such as voice call traffic, data traffic, messaging traffic, signaling traffic, etc.) from UE 701 via the air interface, and may communicate the traffic to UPF/PGW-U 735 (e.g., via SGW 717) and/or one or more other devices or networks. Further, RAN 712 may receive signaling traffic, control plane traffic, etc. from UE 701 via the air interface, and may communicate such signaling traffic, control plane traffic, etc. to MME 716 and/or one or more other devices or networks. Additionally, RAN 712 may receive traffic intended for UE 701 (e.g., from UPF/PGW-U 735, MME 716, SGW 717, and/or one or more other devices or networks) and may communicate the traffic to UE 701 via the air interface.

AMF 715 may include one or more devices, systems, Virtualized Network Functions ("VNFs"), Cloud-Native Network Functions ("CNFs"), etc., that perform operations to register UE 701 with the 5G network, to establish bearer channels associated with a session with UE 701, to hand off UE 701 from the 5G network to another network, to hand off UE 701 from the other network to the 5G network, manage mobility of UE 701 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, CNFs, etc., that perform operations to register UE 701 with the EPC, to establish bearer channels associated with a session with UE 701, to hand off UE 701 from the EPC to another network, to hand off UE 701 from another network to the EPC, manage mobility of UE 701 between RANs 712 and/or eNBs 713, and/or to perform other operations.

SGW 717 may include one or more devices, systems, VNFs, CNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 701. In some embodiments, the establishment of communications sessions may be performed in accordance with one or more policies provided by PCF/PCRF 725.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, CNFs, etc., that receive, store, and/or provide information that may be used in determining parameters (e.g., quality of service parameters, charging parameters, or the like) for certain applications.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 701, from DN 750, and may forward the user plane data toward UE 701 (e.g., via RAN 710, SMF/PGW-C 720, and/or one or more other devices). In some embodiments, multiple UPFs 735 may be deployed (e.g., in different geographical locations), and the delivery of content to UE 701 may be coordinated via the N9 interface (e.g., as denoted in FIG. 7 by the line marked "N9" originating and terminating at UPF/PGW-U 735). Similarly, UPF/PGW-U 735 may receive traffic from UE 701 (e.g., via RAN 710, RAN 712, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

UDM/HSS 740 and AUSF 745 may include one or more devices, systems, VNFs, CNFs, etc., that manage, update, and/or store, in one or more memory devices associated with AUSF 745 and/or UDM/HSS 740, profile information associated with a subscriber. AUSF 745 and/or UDM/HSS 740 may perform authentication, authorization, and/or accounting operations associated with the subscriber and/or a communication session with UE 701.

DN 750 may include one or more wired and/or wireless networks. For example, DN 750 may include an IP-based PDN, a wide area network ("WAN") such as the Internet, a private enterprise network, and/or one or more other networks. UE 701 may communicate, through DN 750, with data servers, other UEs 701, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 701 may communicate.

Figure 8:
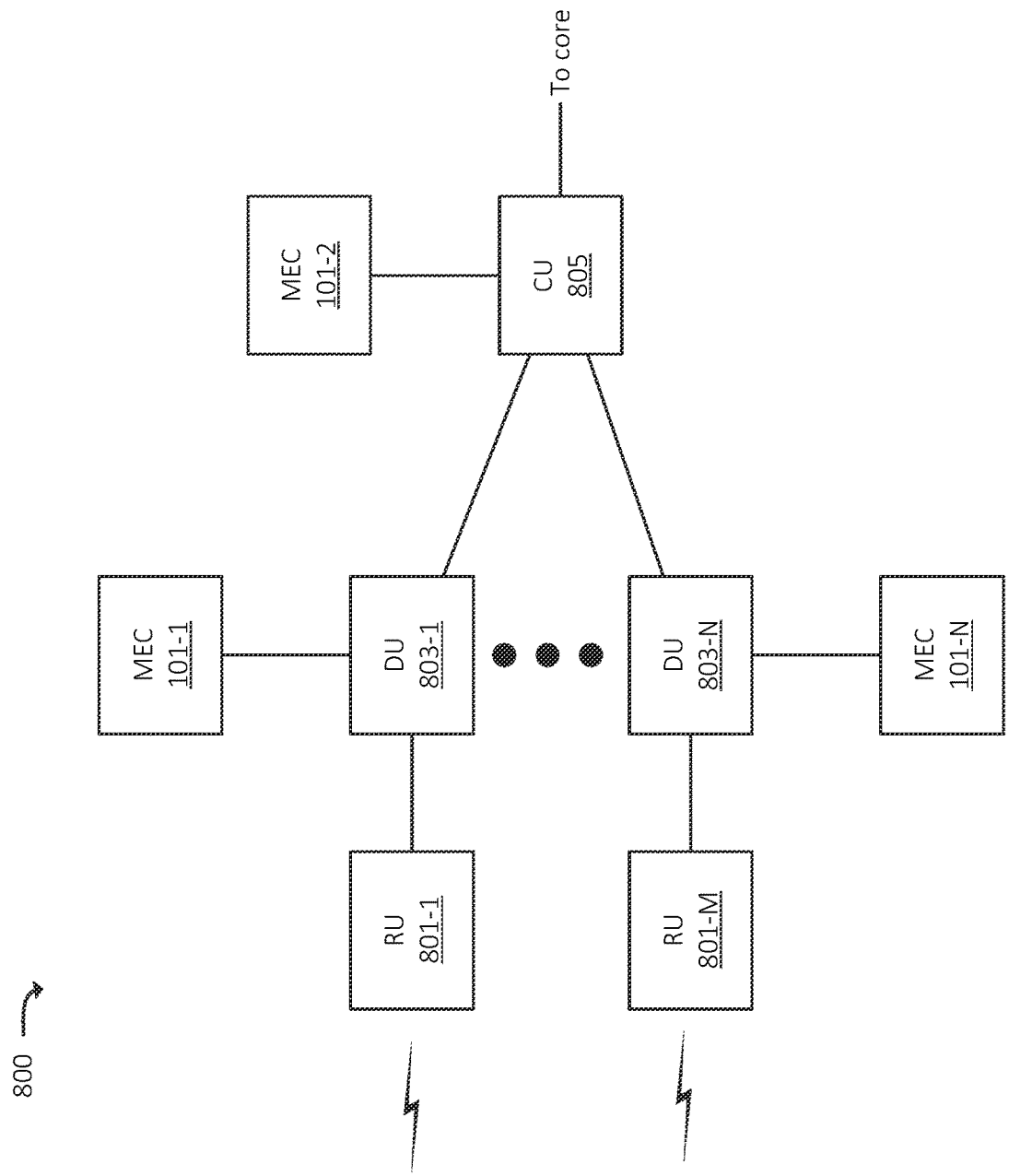
FIG. 8 illustrates an example arrangement of a radio access network ("RAN"), in accordance with some embodiments.

FIG. 8 illustrates an example RAN environment 800, which may be included in and/or implemented by one or more RANs (e.g., RAN 710, RAN 712, or some other RAN). In some embodiments, a particular RAN may include one RAN environment 800. In some embodiments, a particular RAN may include multiple RAN environments 800. In some embodiments, RAN environment 800 may correspond to a particular gNB 711 of a 5G RAN (e.g., RAN 710). In some embodiments, RAN environment 800 may correspond to multiple gNBs 711. In some embodiments, RAN environment 800 may correspond to one or more other types of base stations of one or more other types of RANs. As shown, RAN environment 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 701 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 701, and may determine which DU(s) 803 should receive the downlink traffic. DU 803 may include one or more devices that transmit traffic between a core network (e.g., via CU 805) and UE 701 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 701.

RU 801 may include hardware circuitry (e.g., one or more RF transceivers, antennas, radios, and/or other suitable hardware) to communicate wirelessly (e.g., via an RF interface) with one or more UEs 701, one or more other DUs 803 (e.g., via RUs 801 associated with DUs 803), and/or any other suitable type of device. In the uplink direction, RU 801 may receive traffic from UE 701 and/or another DU 803 via the RF interface and may provide the traffic to DU 803. In the downlink direction, RU 801 may receive traffic from DU 803, and may provide the traffic to UE 701 and/or another DU 803.

One or more elements of RAN environment 800 may, in some embodiments, be communicatively coupled to one or more Multi-Access/Mobile Edge Computing ("MEC") devices, referred to sometimes herein simply as "MECs" 101. For example, DU 803-1 may be communicatively coupled to MEC 101-1, DU 803-N may be communicatively coupled to MEC 101-N, CU 805 may be communicatively coupled to MEC 101-2, and so on. MECs 101 may include hardware resources (e.g., configurable or provisionable hardware resources) that may be configured to provide services and/or otherwise process traffic to and/or from UE 701, via a respective RU 801.

For example, DU 803-1 may route some traffic, from UE 701, to MEC 101-1 instead of to a core network via CU 805. MEC 101-1 may process the traffic, perform one or more computations based on the received traffic, and may provide traffic to UE 701 via RU 801-1. In some embodiments, MEC 101 may include, and/or may implement, some or all of the functionality described above with respect to EDS 105, AF 730, UPF 735, and/or one or more other devices, systems, VNFs, CNFs, etc. In this manner, ultra-low latency services may be provided to UE 701, as traffic does not need to traverse DU 803, CU 805, links between DU 803 and CU 805, and an intervening backhaul network between RAN environment 800 and the core network.

Figure 9:
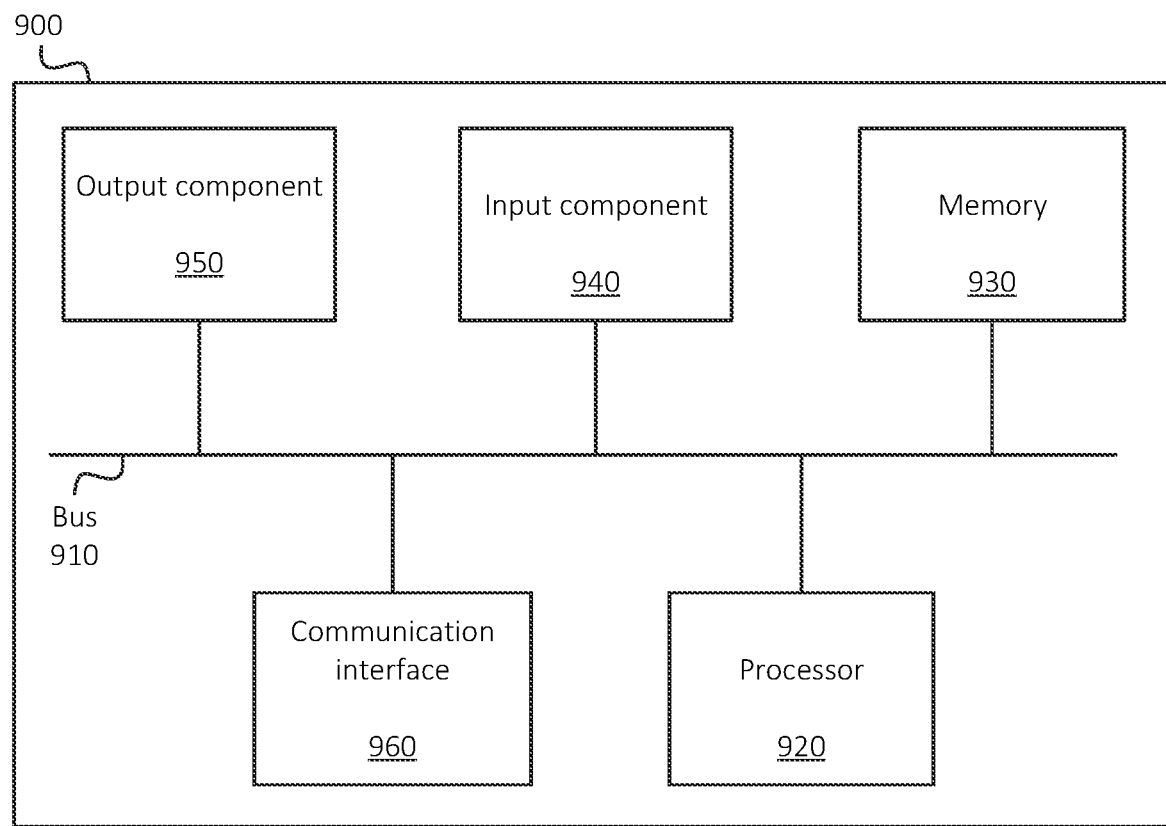
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth© radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance.

Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
a non-transitory memory device storing a plurality of processor-executable instructions; and
one or more processors configured to execute the plurality of processor-executable instructions, wherein executing the processor-executable instructions causes the one or more processors to:
identify a particular service provided by a first Edge Computing ("EC") device to a particular User Equipment ("UE");
determine a location of the particular UE;
monitor performance information associated with at least one of:
the first EC device, or
a second EC device,
wherein monitoring the performance information associated with the first EC device includes:
determining a measure of latency associated with the first EC device, wherein determining the measure of latency associated with the first EC device includes determining a first measure of latency that is associated with the location of the particular UE, wherein the first EC device is associated with at least a second measure of latency that is associated with one or more other locations, or
determining a measure of throughput associated with the first EC device, wherein determining the measure of throughput associated with the first EC device includes determining a first measure of throughput that is associated with the location of the particular UE, wherein the first EC device is associated with at least a second measure of throughput that is associated with one or more other locations;
determine, based on monitoring the performance information, that the second EC device should provide the service to the particular UE in lieu of the first EC device; and
cause, based on the determining, the service to be provided to the particular UE by the second EC device in lieu of the first EC device, wherein causing the service to be provided by the second EC device includes at least one of:
notifying the first EC device that the second EC device has been selected to provide the service to the particular UE in lieu of the first EC device, or
notifying the second EC device that the second EC device has been selected to provide the service to the particular UE in lieu of the first EC device.

2. The device of claim 1, wherein the one or more processors are further configured to:
identify a particular set of threshold measures of performance associated with the service; and
determine that one or more measures of performance, associated with the second EC device, exceed the particular set of threshold measures of performance associated with the service,
wherein determining that the second EC device should provide the service to the particular UE is based on determining that the one or more measures of performance, associated with the second EC device, exceed the particular set of threshold measures of performance associated with the service.

3. The device of claim 1, wherein causing the service to be provided by the second EC device includes:
receiving a confirmation, from the particular UE, that the second EC is authorized by the particular UE to provide the service to the particular UE.

4. The device of claim 1, wherein causing the service to be provided by the second EC device includes:
causing a context, associated with the service, to be transferred from the first EC to the second EC.

5. The device of claim 1, wherein the one or more processors are further configured to:
maintain location information associated with the first and second ECs;
monitor or predict a location of the particular UE; and
compare the monitored or predicted location of the particular UE to the location information associated with the first and second ECs,
wherein determining that the second EC device should provide the service to the particular UE in lieu of the first EC device is further based on comparing the monitored or predicted location of the particular UE to the location information associated with the first and second ECs.

6. A non-transitory computer-readable medium, storing a plurality of processor-executable instructions to:
identify a particular service provided by a first ("EC") device to a particular User Equipment ("UE");
determine a location of the particular UE;
monitor performance information associated with at least one of:
the first EC device, or
a second EC device,
wherein monitoring the performance information associated with the first EC device includes:
determining a measure of latency associated with the first EC device, wherein determining the measure of latency associated with the first EC device includes determining a first measure of latency that is associated with the location of the particular UE, wherein the first EC device is associated with at least a second measure of latency that is associated with one or more other locations, or
determining a measure of throughput associated with the first EC device, wherein determining the measure of throughput associated with the first EC device includes determining a first measure of throughput that is associated with the location of the particular UE, wherein the first EC device is associated with at least a second measure of throughput that is associated with one or more other locations;
determine, based on monitoring the performance information, that the second EC device should provide the service to the particular UE in lieu of the first EC device; and
cause, based on the determining, the service to be provided to the particular UE by the second EC device in lieu of the first EC device, wherein causing the service to be provided by the second EC device includes at least one of:

notifying the first EC device that the second EC device has been selected to provide the service to the particular UE in lieu of the first EC device, or notifying the second EC device that the second EC device has been selected to provide the service to the particular UE in lieu of the first EC device.

7. The non-transitory computer-readable medium of claim 6, wherein the plurality of processor-executable instructions further include processor-executable instructions to:

identify a particular set of threshold measures of performance associated with the service; and determine that one or more measures of performance, associated with the second EC device, exceed the particular set of threshold measures of performance associated with the service, wherein determining that the second EC device should provide the service to the particular UE is based on determining that the one or more measures of performance, associated with the second EC device, exceed the particular set of threshold measures of performance associated with the service.

8. The non-transitory computer-readable medium of claim 6, wherein causing the service to be provided by the second EC device includes:

receiving a confirmation, from the particular UE, that the second EC is authorized by the particular UE to provide the service to the particular UE.

9. The non-transitory computer-readable medium of claim 6, wherein causing the service to be provided by the second EC device includes:

causing a context, associated with the service, to be transferred from the first EC to the second EC.

10. The non-transitory computer-readable medium of claim 6, wherein the plurality of processor-executable instructions further include processor-executable instructions to:

maintain location information associated with the first and second ECs;

monitor or predict a location of the particular UE; and compare the monitored or predicted location of the particular UE to the location information associated with the first and second ECs, wherein determining that the second EC device should provide the service to the particular UE in lieu of the first EC device is further based on comparing the monitored or predicted location of the particular UE to the location information associated with the first and second ECs.

11. A method, comprising:

identifying a particular service provided by a first Edge Computing ("EC") device to a particular User Equipment ("UE");

determining a location of the particular UE;

monitoring performance information associated with at least one of:

the first EC device, or a second EC device, wherein monitoring the performance information associated with the first EC device includes:

determining a measure of latency associated with the first EC device, wherein determining the measure of latency associated with the first EC device includes determining a first measure of latency that is associated with the location of the particular UE, wherein the first EC device is associated with at least a second measure of latency that is associated with one or more other locations, or determining a measure of throughput associated with the first EC device, wherein determining the measure of throughput associated with the first EC device includes determining a first measure of throughput that is associated with the location of the particular UE, wherein the first EC device is associated with at least a second measure of throughput that is associated with one or more other locations;

determining, based on monitoring the performance information, that the second EC device should provide the service to the particular UE in lieu of the first EC device; and causing, based on the determining, the service to be provided to the particular UE by the second EC device in lieu of the first EC device, wherein causing the service to be provided by the second EC device includes at least one of:

notifying the first EC device that the second EC device has been selected to provide the service to the particular UE in lieu of the first EC device, or notifying the second EC device that the second EC device has been selected to provide the service to the particular UE in lieu of the first EC device.

12. The method of claim 11, further comprising:

identifying a particular set of threshold measures of performance associated with the service; and determining that one or more measures of performance, associated with the second EC device, exceed the particular set of threshold measures of performance associated with the service, wherein determining that the second EC device should provide the service to the particular UE is based on determining that the one or more measures of performance, associated with the second EC device, exceed the particular set of threshold measures of performance associated with the service.

13. The method of claim 11, wherein causing the service to be provided by the second EC device includes:

receiving a confirmation, from the particular UE, that the second EC is authorized by the particular UE to provide the service to the particular UE.

14. The method of claim 11, wherein causing the service to be provided by the second EC device includes:

causing a context, associated with the service, to be transferred from the first EC to the second EC.

15. The method of claim 11, further comprising:

maintaining location information associated with the first and second ECs;

monitoring or predicting a location of the particular UE; and comparing the monitored or predicted location of the particular UE to the location information associated with the first and second ECs, wherein determining that the second EC device should provide the service to the particular UE in lieu of the first EC device is further based on comparing the monitored or predicted location of the particular UE to the location information associated with the first and second ECs.

16. The method of claim 11, wherein monitoring the performance information associated with the second EC device includes:

determining a measure of latency associated with the second EC device, or determining a measure of throughput associated with the second EC device.

17. The method of claim 16,
wherein determining the measure of latency associated with the second EC device includes determining the first measure of latency that is associated with the location of the particular UE, wherein the second EC device is associated with at least a third measure of latency that is associated with one or more other locations, and wherein determining the measure of throughput associated with the second EC device includes determining the first measure of throughput that is associated with the location of the particular UE, wherein the second EC device is associated with at least a third measure of throughput that is associated with one or more other locations.

18. The device of claim 1, wherein monitoring the performance information associated with the second EC device includes:
determining a measure of latency associated with the second EC device, or
determining a measure of throughput associated with the second EC device.

19. The device of claim 18,
wherein determining the measure of latency associated with the second EC device includes determining the first measure of latency that is associated with the location of the particular UE, wherein the second EC device is associated with at least a third measure of latency that is associated with one or more other locations, and wherein determining the measure of throughput associated with the second EC device includes determining the first measure of throughput that is associated with the location of the particular UE, wherein the second EC device is associated with at least a third measure of throughput that is associated with one or more other locations.

20. The non-transitory computer-readable medium of claim 6, wherein monitoring the performance information associated with the second EC device includes:
determining a measure of latency associated with the second EC device, wherein determining the measure of latency associated with the second EC device includes determining the first measure of latency that is associated with the location of the particular UE, wherein the second EC device is associated with at least a third measure of latency that is associated with one or more other locations, or determining a measure of throughput associated with the second EC device, wherein determining the measure of throughput associated with the second EC device includes determining the first measure of throughput that is associated with the location of the particular UE, wherein the second EC device is associated with at least a third measure of throughput that is associated with one or more other locations.

\* \* \* \* \*